United States Patent [19]
Dawson et al.

[11] Patent Number: 5,358,539
[45] Date of Patent: Oct. 25, 1994

[54] METHOD FOR MAKING A BATTERY ASSEMBLY

[75] Inventors: Lev M. Dawson, Los Altos; Scot S. Cheu, San Jose, both of Calif.

[73] Assignee: Valence Technology, Inc., San Jose, Calif.

[21] Appl. No.: 968,179

[22] Filed: Oct. 29, 1992

[51] Int. Cl.$^5$ .............................................. H01M 6/00
[52] U.S. Cl. .................................................. 29/623.2
[58] Field of Search ................ 29/623.2, 623.1, 623.4; 429/153, 163, 162; 53/79, 403

[56] References Cited

U.S. PATENT DOCUMENTS

| | | | |
|---|---|---|---|
| 3,607,430 | 9/1971 | Glover | 29/623.2 |
| 3,900,341 | 8/1975 | Shoichiro et al. | 29/623.2 |
| 3,905,233 | 9/1975 | Smith, Jr. et al. | |
| 4,019,251 | 4/1977 | McCole | 29/623.2 |
| 4,690,879 | 9/1987 | Huhndorff et al. | |
| 4,887,348 | 12/1989 | Tamminen | |
| 4,891,048 | 1/1990 | Kummel et al. | 29/623.1 |
| 4,997,732 | 3/1991 | Austin et al. | |
| 5,057,382 | 10/1991 | Tucholski | |
| 5,171,648 | 12/1992 | Beard | |

FOREIGN PATENT DOCUMENTS

| | | |
|---|---|---|
| 0322112 | 6/1989 | European Pat. Off. |
| 0364995 | 4/1990 | European Pat. Off. |
| 0370634 | 5/1990 | European Pat. Off. |
| 0470726 | 2/1992 | European Pat. Off. |

OTHER PUBLICATIONS

Shackle, Dale; "Packaging Solid State Cells"; *Research Disclosure;* Apr. 1988, p. 204.

*Primary Examiner*—Anthony Skapars
*Attorney, Agent, or Firm*—James S. Hsue

[57] ABSTRACT

A terminal for a battery assembly is adapted to lose electrical conduct with a battery cell in the presence of gases within a battery chamber thereby disabling the battery. The disabling of the battery assembly gives the user an indication that the battery is defective and should not be recharged. Additionally, because the battery is disabled, no more gases will be formed in the battery assembly so the seal or the protective envelope will not burst exposing the battery cell to the environment.

6 Claims, 6 Drawing Sheets

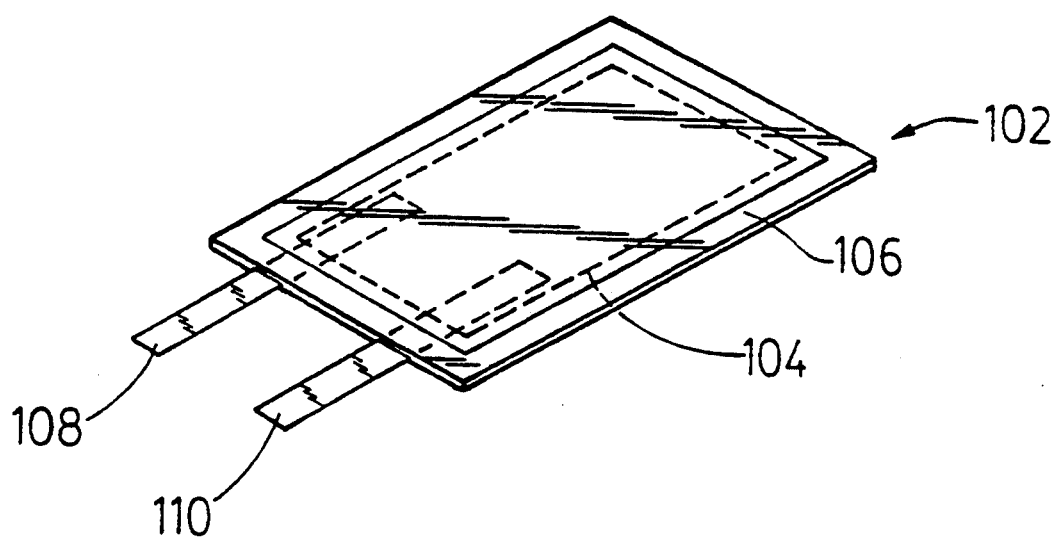
FIG._1.
(PRIOR ART)

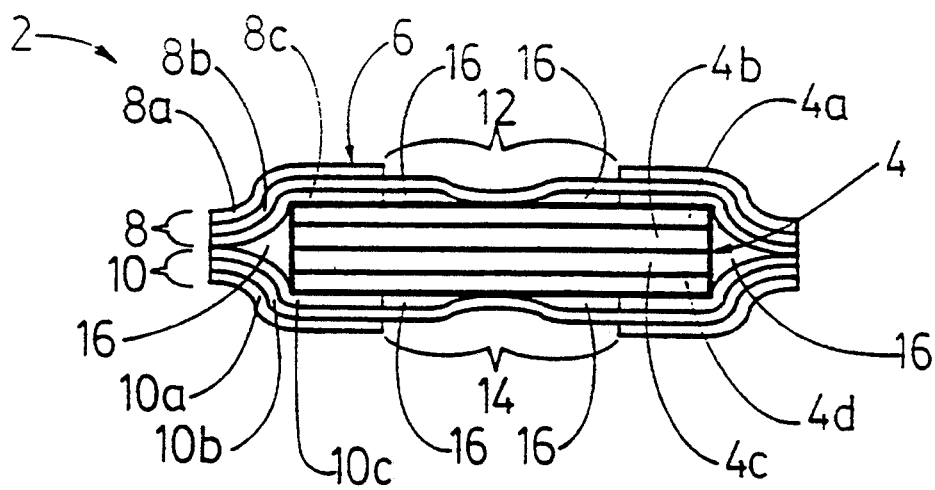
FIG._2(a).
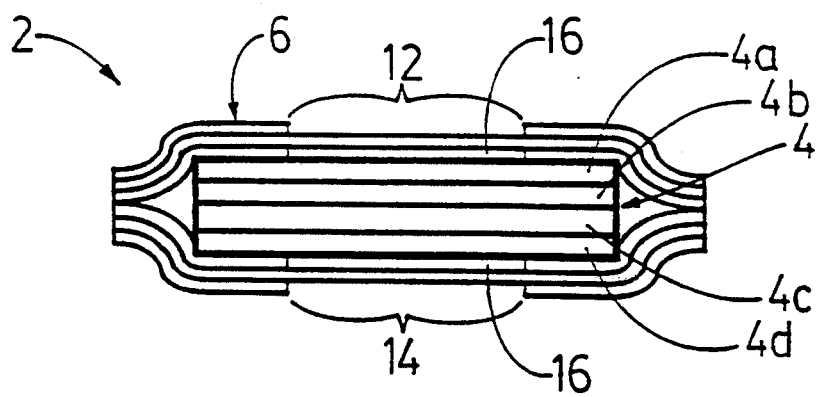
FIG._2(b).
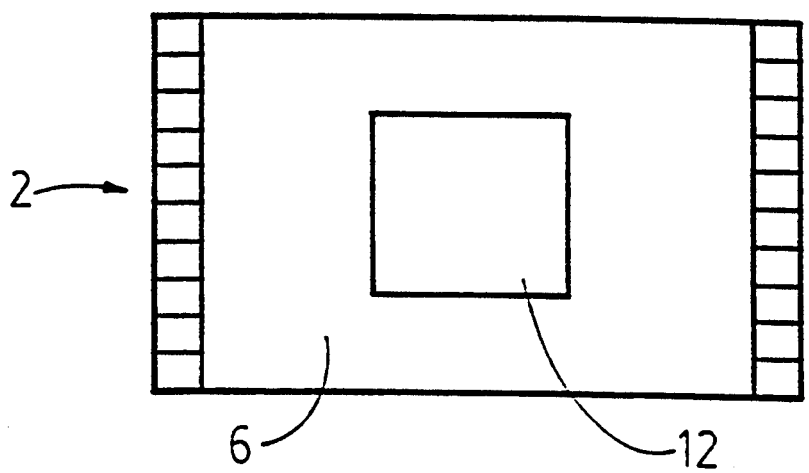
FIG._2(c).

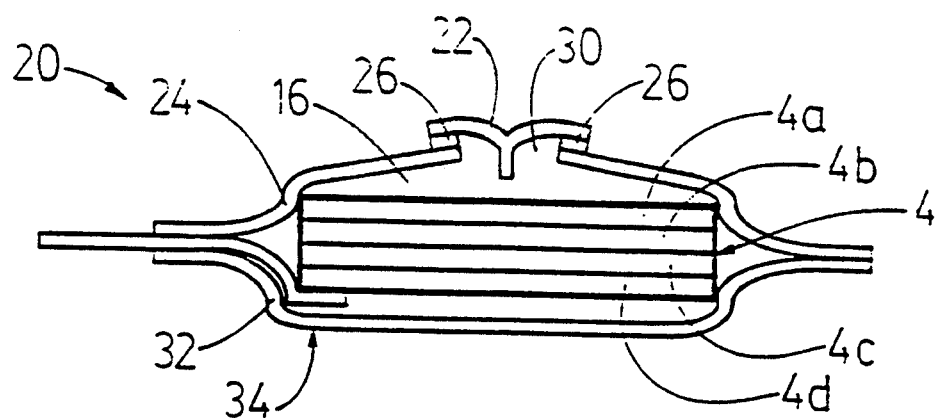
FIG.__3(a).
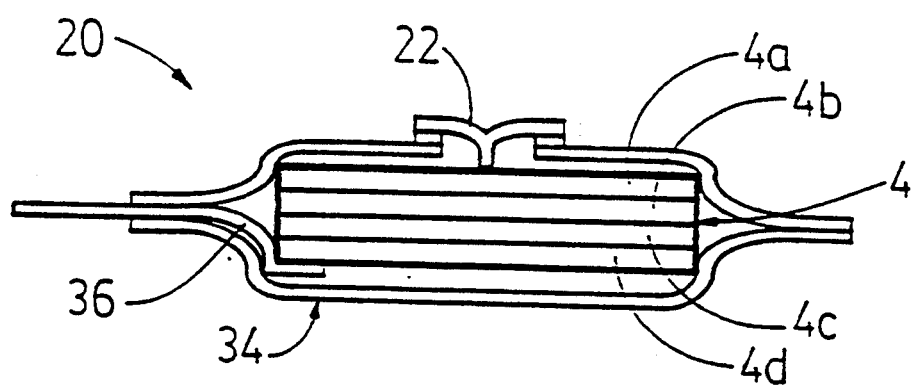
FIG.__3(b).
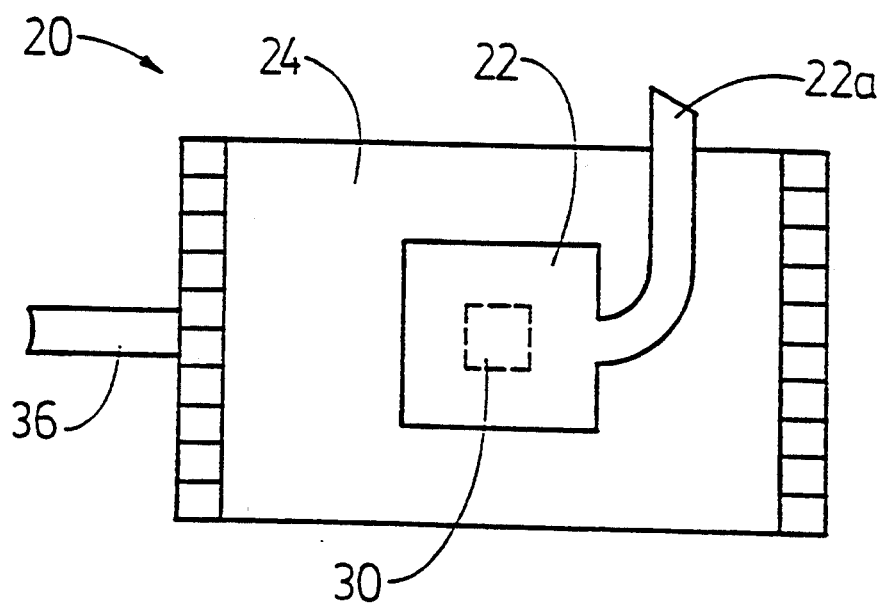
FIG.__3(c).

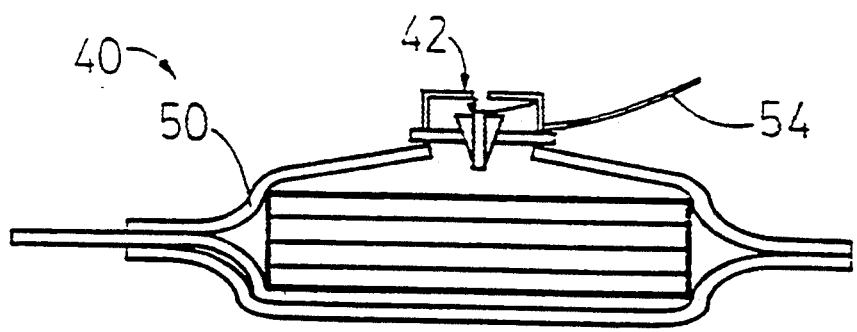
FIG._4(a).
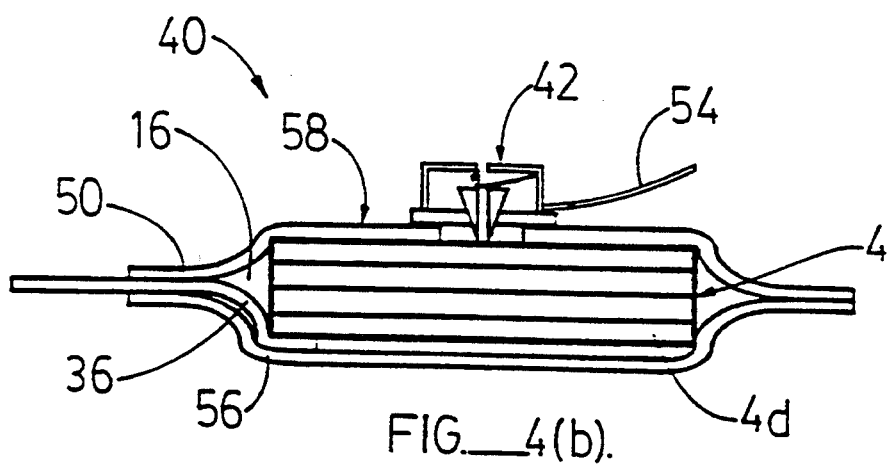
FIG._4(b).
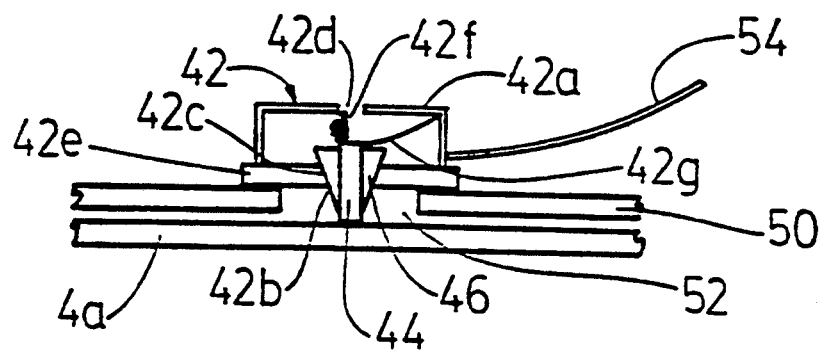
FIG._4(c).
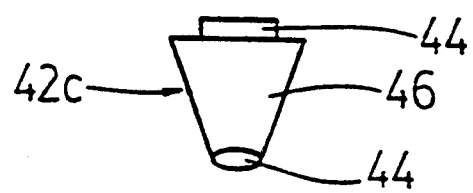
FIG._4(d).

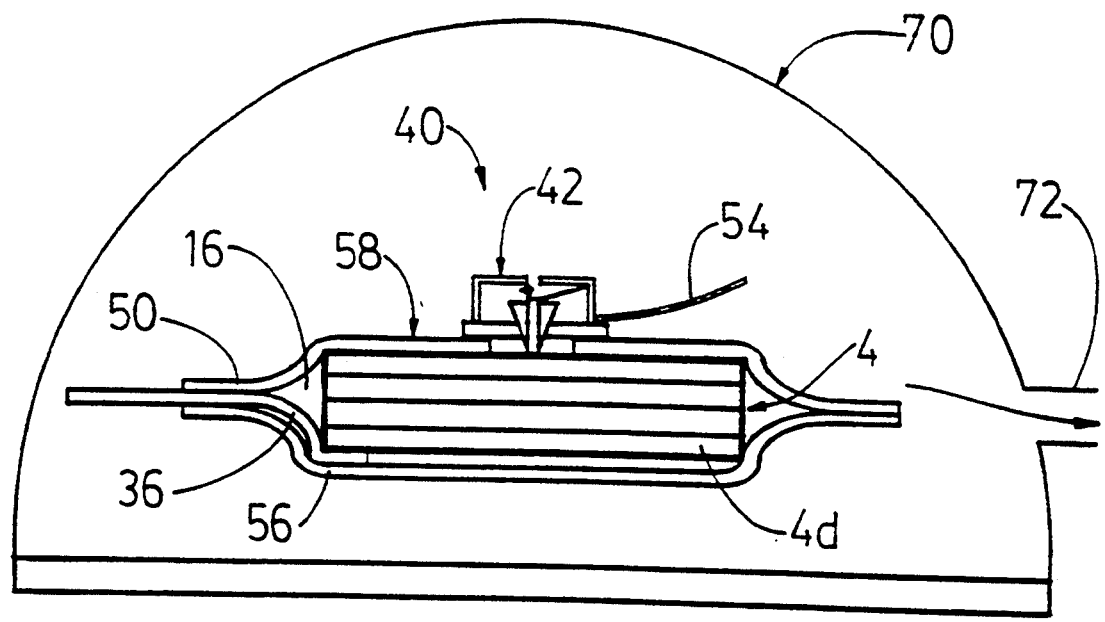
FIG._4(e).
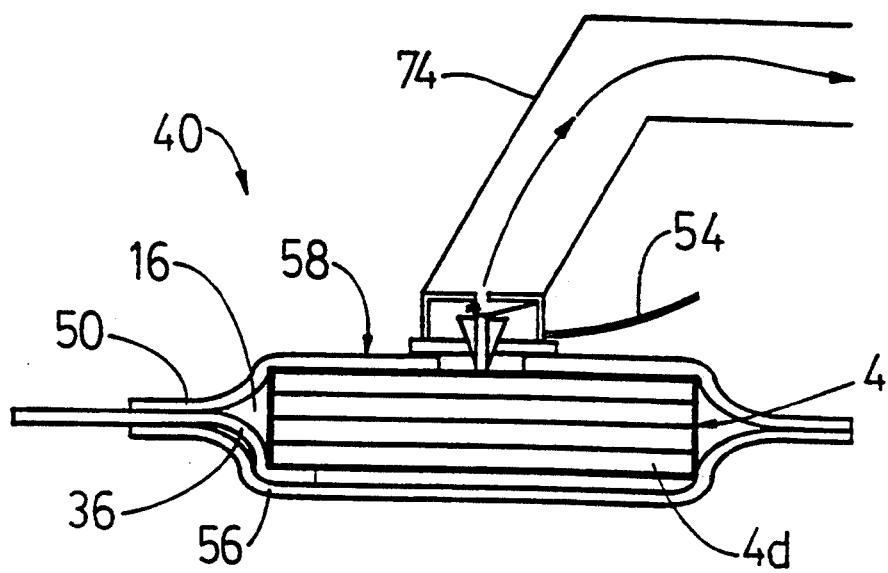
FIG._4(f).

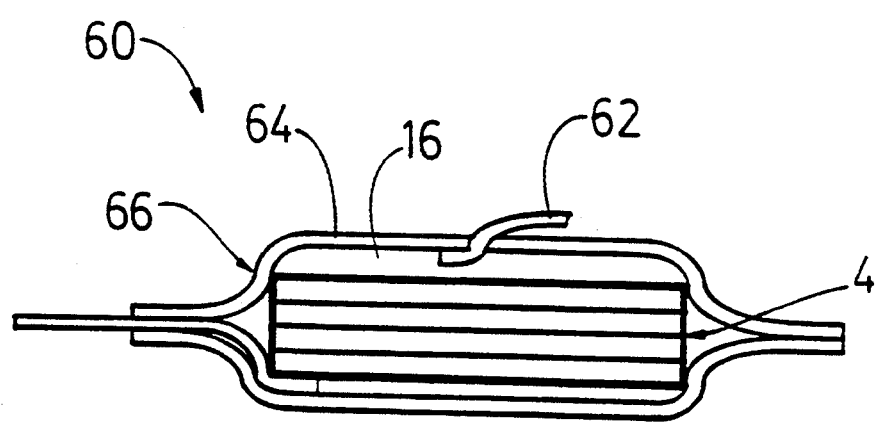
FIG._5(a).

METHOD FOR MAKING A BATTERY ASSEMBLY

BACKGROUND OF THE INVENTION

This invention relates in general to the field of battery packaging. Solid-state batteries are advantageous, since they possess a number of very desirable characteristics, including the absence of liquid leakage or gassing, long shelf life, and operation over a wide temperature range. A number of solid-state batteries have been proposed.

One such battery which has received wide attention is one employing a polymer cathode, a polymer electrolyte, and a lithium anode. For an example of a lithium anode battery, see U.S. Pat. No. 4,997,732 issued to Austin et al. ("Austin et al.").

Lithium is highly reactive, so the lithium battery cell must be sealed in a protective material to exclude air, water and other gases from contacting the lithium. The prior art battery cell of Austin et al. shown in FIG. 1 comprises a battery assembly 102, including a thin laminar battery cell 104 shown in phantom, enclosed by a multi-layered protective sheet material 106. Connected to the battery cell 104 are terminals 108 and 110. The multi-layered protective sheet material 106 is made of an inner thermoplastic layer, a middle metal foil layer and an outer thermoplastic layer.

A problem with the prior art battery assembly is that a defective lithium battery cell may form gases that could threaten to burst the seal or the protective sheet material 106 and expose the reactive lithium to the external environment. It is therefore desirable to provide an improved battery assembly in which this problem is not present.

SUMMARY OF THE INVENTION

By using an interconnection scheme where a terminal is adapted to be disconnected from its contact with a battery cell in the presence of gases within a protective envelope thereby disabling the battery, it is possible to give an indication to the user that the battery is defective and should not be recharged. Additionally, because the battery is disabled, no more gases will be formed by the defective battery cell so the seal or the protective material will not burst exposing the battery cell to the environment.

One aspect of the invention is directed toward a battery assembly comprising a laminar battery cell, at least one terminal having a portion in electrical contact with the cell, and a protective envelope. The protective envelope defines a chamber therein enveloping the cell to protect the cell from the environment. At least a portion of the protective envelope is adapted to flex outward in response to the presence of gases in the chamber, causing the portion of the at least one terminal to lose electrical contact with the battery cell.

Another aspect of the invention is directed toward a method for making a battery assembly. The method comprises providing a laminar battery cell and a protective envelope with a terminal not in electrical contact with the cell, enclosing the laminar battery cell in said protective envelope, said envelope defining a chamber, and evacuating and sealing said chamber causing the terminal to contact the battery cell.

BRIEF DESCRIPTION OF THE DRAWINGS

FIG. 1 is a top view of a prior art battery assembly.

FIG. 2(a) is a cross-sectional view of a battery assembly of the preferred embodiment of the present invention showing two terminals in contact with the laminar battery cell.

FIG. 2(b) is a cross-sectional view of the battery assembly of the preferred embodiment of FIG. 2(a) showing two terminals that have lost contact with the laminar battery cell due to the presence of gases in the battery chamber.

FIG. 2(c) is a top view of FIG. 2(a).

FIG. 3(a) is a cross-sectional view of the battery assembly of an alternative embodiment of the present invention showing a terminal that has lost contact with the laminar battery cell due to the presence of gases in the battery chamber.

FIG. 3(b) is a cross-sectional view of the battery assembly of the embodiment of FIG. 3(a) showing the terminal in contact with the laminar battery cell.

FIG. 3(c) is a top view of the embodiment of FIG. 3(a).

FIG. 4(a) is a cross-sectional view of the battery assembly of another alternative embodiment of the present invention showing a terminal connected to a check valve that has lost contact with the laminar battery cell due to the presence of gases in the battery chamber.

FIG. 4(b) is a cross-sectional view of the battery assembly of FIG. 4(a) showing the terminal connected through a conductive portion of the check valve to the laminar battery cell 4.

FIG. 4(c) is a cross-sectional view of the check valve used in the embodiment of FIG. 4(a).

FIG. 4(d) is a side view of a plug used in the check valve of the embodiment of FIG. 4(a).

FIG. 4(e) is a cross-sectional view of the battery assembly of the embodiment of FIG. 4(a) and a vacuum chamber used to evacuate the battery chamber.

FIG. 4(f) is a cross-sectional view of the battery assembly of the embodiment of FIG. 4(a) and a vacuum hose used to evacuate the battery chamber.

FIG. 5 is a cross-sectional view of the battery assembly of yet another alternative embodiment of the present invention showing a terminal of which a portion is contained within the battery chamber.

Equivalent structures are labelled with the same numbers between the figures.

DETAILED DESCRIPTION OF THE PREFERRED EMBODIMENT

FIG. 2(a) is a cross-sectional view of the battery assembly 2 of the preferred embodiment of the present invention showing two terminals 12 and 14 in contact with the laminar battery cell 4. The laminar battery cell 4 includes current collector 4a, cathode 4b, electrolyte 4c, and lithium anode 4d. The laminar battery cell 4 is placed in a protective envelope 6. The protective envelope 6 is comprised of two pieces of multi-layer package material 8 and 10. Each piece of multi-layer package material is constructed of at least an outer insulator layer 8a and 10a, a middle electrically conductive layer 8b and 10b, and an inner insulator layer 8c and 10c.

The multi-layer packaging material can include more than three layers. The multi-layer packaging material 8 and 10 may be one of the commercially available multi-layered high barrier flexible packaging materials disclosed in Austin et al. Another high barrier flexible multi-layer packaging material suitable for use as the multi-layered packaging material 8 and 10 is a seven layered packaging material comprised of (going from the outer layers inward) sixty gauge biax oriented nylon (BON)/fifteen pounds of polyethylene (PE)/0.0003 foil/seven pounds of PE/sixty gauge BON/seven pounds of PE/four mils of Surlyn ® brand resin from Dupont. For this seven-layered packaging material, the outer insulator layers 8a and 10a each comprises a layer of sixty gauge BON, and a layer of fifteen pounds of PE; the middle electrically conductive layers 8b and 10b each comprises a layer of 0.0003 foil; and the inner insulator layers 8c and 10c each comprises a layer of seven pounds of PE, a layer of sixty gauge BON, another layer of seven pounds of PE and a layer of four mils of Surlyn ® brand resin from Dupont.

Terminals 12 and 14 can be formed by stripping away the insulator layers 8a, 8c, 10a, and 10c from areas on the multi-level packaging material 8 and 10. The exposed areas of the conductive layers 8b and 10b act as the terminals 12 and 14 so that the terminals 12 and 14 are integral with and form a part of the protective envelope 6.

The laminar battery cell 4 is enclosed in the protective envelope 6. The protective envelope 6 forms a battery chamber 16. The battery chamber 16 is evacuated and the envelope 6 is sealed in a vacuum sealing operation. The protective envelope 6 now protects the laminar battery cell 4 from the environment. Air, water, and other gases are excluded from contacting the reactive lithium anode 4d.

The vacuum sealing operation also causes the terminal 12 to flex and contact the current collector 4a and causes the terminal 14 to flex and contact the lithium anode 4d. Since air is removed from battery chamber 16 in the vacuum sealing operation, the terminals 12 and 14 are flexed inward by the atmospheric pressure. Both terminals 12 and 14 are now in electrical contact with the laminar battery cell 4. The inner insulator layers 8c and 10c prevent the terminals 12 and 14 from shorting together.

FIG. 2(b) is a cross-sectional view of the battery assembly of the preferred embodiment of FIG. 2(a) showing two terminals 12 and 14 that have lost contact with the laminar battery cell 4 due to the presence of gases in the battery chamber 16. Terminals 12 and 14, integral parts of protective envelope 6, are adapted to flex outward in response to the presence of gases in the battery chamber 16. Gases produced by a defective battery cell increase the gas pressure in the battery chamber 16 thus causing the terminals 12 and 14 to flex away from the battery cell 4. Terminal 12 loses electrical contact with the current collector 4a and terminal 14 loses contact with the lithium anode 4d. In this way, the battery assembly 2 is disabled and the user is given an indication that the battery is defective and should not be recharged. Furthermore, the recharging of the battery is prevented since terminals 12 and 14 are not connected to the battery cell. Additionally, since the battery is disabled, no more gases are produced by the defective battery cell so the protective envelope 6 will not burst exposing the reactive lithium anode 4d to the environment.

FIG. 2(c) is a top view of the preferred embodiment of FIG. 2(a) showing the protective envelope 6 and one of the terminals 12.

A terminal on the protective envelope may also be formed with an electrically conductive layer surrounding a hole in a packaging material layer. FIG. 3(a) is a cross-sectional view of the battery assembly 20 of an alternative embodiment of the present invention showing a terminal 22 that has lost contact with the laminar battery cell 4 due to the presence of gases in the battery chamber 16. A layer of packaging material 24 can comprise a multi-layer high barrier flexible packaging material with or without a foil layer. If the packaging material 24 comprises a multi-layer high barrier flexible packaging material without a foil layer, the whole packaging material layer 24 comprises an insulator layer. The multi-layer high barrier flexible packaging material without a foil layer may comprise layers of EZOH, nylon, polypropylene or polyethylene laminated together. Alternately, the multi-layer high barrier flexible packaging material without a foil layer may comprise a PVC coated material such as a PVC coated nylon.

If the packaging material 24 comprises a multi-layer high barrier flexible packaging material with a foil layer, the packaging material 24 may comprise the seven-layer packaging material described above or one of the high barrier multi-layered packaging materials described in Austin et al. Each of these multi-layer high barrier flexible packaging material with a foil layer has an outer insulator layer (not shown).

A section is cut out of a packaging material layer 24 to form a hole 30. The terminal 22 constructed of an electrically conductive layer is attached with adhesive 26 to the packaging material 24 in a manner that the hole 30 is sealed. The adhesive 26 may be Surlyn ® brand resin from Dupont. The protective envelope 34 is formed from packaging material layers 24 and 32 and the terminal 22. The packaging material layer 24 or the terminal 22 is adapted to flex outward from the battery cell 4 in the presence of gases formed by a defective battery cell.

FIG. 3(b) is a cross-sectional view of the battery assembly 20 of an embodiment of FIG. 3(a) showing the terminal 22 in contact with the laminar battery cell 4. As described above in the description of the preferred embodiment, the protective envelope 34 is vacuum sealed to form the electrical contact between the terminal 22 and the current collector 4a. Since only one terminal need to lose contact with the battery cell 4 for the battery assembly 20 to be disabled, the other terminal 36 can be permanently attached to the lithium anode 4d. Since the packaging material layer 24 comprises an insulator layer or includes an outer insulator layer (not shown), the terminal 22 is not shorted to the other terminal 36.

FIG. 3(c) is a top view of the embodiment of FIG. 3(a). The hole 30 in the packaging material layer 24 is shown in phantom. As shown, the terminal 22 may include a tab 22a.

FIG. 4(c) is a cross-sectional view of a check valve 42 used in the embodiment of FIG. 4(a). The one-way check valve 42 is a modification of a commercially available check valve, such as the check valve available from Robert Bosch Corporation, 15 Seely Ave., Piscapaway, N.J. 08854. The valve 42 is used to allow gases in the battery chamber to escape.

A spring 42f biases a plug 42c so that an inlet 42b of the check valve 42 is normally plugged up and fluids from the environment cannot enter. Gas pressure inside the battery assembly, however, may move the plug 42c and allow fluids from inside the battery assembly to exit to the environment though inlet 42b.

Additionally, the check valve 42 is modified so that it includes an electrically conductive portion that is normally in electrical contact with the battery cell. A terminal 54 is shown in electrical contact with the battery cell 4 through the electrically conductive portion of the check valve 42. The electrically conductive portion of the check valve 42 includes a center section 44 of the plug 42c, a wire 42g or a spring 42f, and a metal case 42a. The electrically conductive terminal 54 is attached to the metal case 42a of the check valve 42. The metal case 42a is in electrical contact with a spring 42f made of an electrically conductive material. The spring 42f made of an electrically conductive material is in electrical contact with the electrically conductive center 44 of plug 42c. Alternatively, if the spring 42f is not made of an electrically conductive material, an electrically conductive wire 42g may connect between the electrically conductive center 44 of the plug 42c and the metal case 42a. The plug 42c comprises an electrically conductive center section 44 and an outer rubber seal section 46. The electrically conductive center section 44 of plug 42c is normally in contact with the current collector 4a.

FIG. 4(d) is a side view of the plug 42c used in the check valve of the embodiment of FIG. 4(a). This view shows the outer rubber seal section 46 and the electrically conductive center section 44.

Looking again at FIG. 4(c), in order to incorporate valve 42 into the protective envelope, a hole 52 is formed in the packaging material layer 50 which is part of the multi-layer package shown in FIG. 4(b). As shown in FIG. 4(c), check valve 42 has an inlet 42b and an outlet 42d. Check valve 42 also has a flange 42e adapted to contact and be attached to the packaging material layer 50. As described above, the packaging material layer 50 may comprise an insulator layer or include an outer insulator layer (not shown). Flange 42e may be attached to the packaging material layer 50 by tape with adhesives on both sides, or by a heat seal layer composed of a material such as low-density polyethylene or Surlyn ® brand resin from Dupont. After inlet 42b of the valve 42 is aligned with hole 52, flange 42e is brought into contact with the packaging material layer 50 so that the adhesive or tape attaches flange 42e to the packaging material layer 50. If necessary, a fixture is used to apply pressure between flange 42e and the packaging material layer 50, and heat is supplied where necessary. Such fixture and heating operation is similar to those employed in bottle capping or sticker operations or fitmounts mounting operations. Instead of heating the valve in order to seal the flange 42e to the packaging material layer 50, ultrasonic energy may be applied to the flange 42e to accomplish the same result.

After the valve 42 is thus incorporated into a portion of the protective envelope, the protective envelope may then be employed to seal and enclose the battery cell 4 within a battery chamber.

FIG. 4(b) is a cross-sectional view of the battery assembly of the alternative embodiment of FIG. 4(a) showing the terminal connected through a conductive portion of the check valve 42 to a laminar battery cell 4. The protective envelope 58 comprises packaging material layers 50 and 56. The protective envelope 58 encloses the battery cell 4 within the battery chamber 16, where check valve 42 controls the passage of fluids between chamber 16 and the environment outside envelope 58.

FIG. 4(e) is a cross-sectional view of battery assembly 40 of the embodiment of FIG. 4(a) and a vacuum chamber 70 used to evacuate the battery chamber 16. A method for evacuation includes putting the battery assembly 40 in a vacuum chamber 70, so that the pressure differential between battery chamber 16 and the vacuum chamber 70 causes moisture, air and any other gases inside the battery chamber 16 to escape through check valve 42 into the vacuum chamber 70, where they are drawn out through outlet 72 with a vacuum pump (not shown). After the battery chamber 16 has been evacuated, the battery assembly 40 is retrieved from the vacuum chamber 70, such that the atmospheric pressure causes the envelope 58 to press inward on the battery cell 4. Check valve 42 only permits one-way movement of moisture and gas from the battery chamber 16 to the environment, but does not permit entry of moisture, air or any other gas from the environment to enter the battery chamber 16. The lithium anode 4d in cell 4 is therefore securely isolated from moisture, air and other gases in the atmosphere.

Another method for evacuating the battery assembly is shown in FIG. 4(f). FIG. 4(f) is a cross-sectional view of battery assembly of the embodiment of FIG. 4(a) and a vacuum hose 74 used to evacuate the battery chamber 16. This method includes connecting the vacuum hose 74 to the check valve 42, where the vacuum hose 74 is connected to a vacuum pump (not shown). In this manner, moisture, air and other gases in battery chamber 16 are evacuated through the check valve 42.

In the above two evacuating methods corresponding to FIGS. 4(e) and 4(f), the check valve 42 is caused by the atmospheric pressure to move and contact the battery cell 4 such that the electrically conductive portions of the check valve 42 will form an electrical contact with battery cell 4.

Thus, the overall method for making the battery assembly in this alternative embodiment is as follows. First, a one-way check valve 42 is connected to a protective envelope 58. Then a laminar battery cell 4 and portions of the terminal 36 integral with or in electrical contact with the cell 4 are held in a battery chamber 16 enclosed by the protective envelope 58 by sealing the envelope around the battery cell 4 and portions of the terminal 36. The envelope 58 thus encloses a battery chamber 16 to protect the cell from the environment. Then, in the manner described above, the battery chamber 16 is evacuated.

From the above, it will be evident that the formation of the protective envelope 58 and a sealed battery chamber 16 enclosing the battery cell 4 may be performed under atmospheric pressure instead of under vacuum conditions. This renders a sealing operation much easier to perform. This is especially the case since the sealing operation must ensure that the protective envelope securely seals around the terminal 36 by applying pressure and the heat thereto without breaking or otherwise damaging the terminal 36.

Additionally, the one-way check valve 42 has safety benefits. As discussed above, a defective battery may produce gases in the battery chamber 16. The one-way check valve 42 allows these gases to escape from the battery assembly 40 and prevents the battery assembly from bursting at the seal. When the internal pressure in the battery chamber is greater than the atmospheric pressure, the one-way check valve 42 allows gases to escape from the battery chamber 16.

As an additional precaution against the bursting of the battery assembly, the terminal including the electrically conductive portions of the check valve 42 can allow for the terminal to lose contact with the battery cell 4. FIG. 4(a) is a cross-sectional view of the battery assembly of an alternative embodiment of the present invention showing a terminal including portions of the check valve 42 that have lost contact with the laminar battery cell 4 due to the presence of gases in the battery chamber 16. The packaging material layer 50 is adapted to flex outward due to the presence of gases in the battery chamber 16. When the gases are produced by a defective battery, the terminal formed with the check valve 42 loses electrical contact with the battery cell 4. When this occurs, the battery assembly 40 is disabled and the user is given an indication that the battery is defective and should not be recharged.

The terminal also may be formed such that a portion of the terminal is contained within the battery chamber 16.

FIG. 5 is a cross-sectional view of the battery assembly 60 of yet another alternative embodiment of the present invention showing a terminal 62 of which a portion is contained within the battery chamber 16. The terminal 62 has lost contact with the laminar battery cell 4 due to the presence of gases in the battery chamber 16. A disadvantage of forming this type of terminal is the difficulty in properly sealing the terminal 62 to the packaging material layer 64 of the protective envelope 66.

While the invention has been described by reference to various embodiments, it will be understood that various modifications may be made without departing from the scope of the invention, which is to be limited only by the appended claims.

What is claimed is:

1. A method for making a battery assembly comprising:
   providing a laminar battery cell and a protective envelope with a terminal not in electrical contact with the cell;
   enclosing the laminar battery cell in said protective envelope, said envelope defining a chamber; and
   evacuating and sealing said chamber causing the terminal to contact the battery cell.

2. The method of claim 1, wherein said providing step comprises:
   providing a multi-layer package material with an electrically conductive middle layer, an outer insulator layer, and an inner insulator layer;
   forming said at least one terminal by stripping away portions of said outer and inner insulator layer; and
   forming said protective envelope from said multi-layer package material.

3. The method of claim 2, wherein the protective envelope forming step includes sealing together pieces of said multi-layer package material, each piece of said multi-layer package material having a terminal therein.

4. The method of claim 1, wherein said providing step comprises:
   providing a layer of package material;
   forming said at least one terminal by cutting away a section of the layer of packaging material to form a hole and attaching an electrically conductive terminal to cover said hole; and
   forming said protective envelope from said layer of package material.

5. The method of claim 1, wherein said evacuating and sealing step comprises:
   sealing the protective envelope; and
   then, evacuating the chamber through a check valve on said protective envelope.

6. The method of claim 1, wherein said evacuating and sealing step comprises vacuum sealing the battery cell in the protective envelope.

* * * * *